United States Patent Office 3,467,711
Patented Sept. 16, 1969

3,467,711
PREPARATION OF N-SUBSTITUTED HYDROXYLAMINES
Henry Bader, Newton Center, and Sheldon Buckler, Lincoln, Mass., assignors to Polaroid Corporation, Cambridge, Mass., a corporation of Delaware
No Drawing. Filed July 12, 1967, Ser. No. 652,714
Int. Cl. C07c 83/04, 83/02
U.S. Cl. 260—583                9 Claims

ABSTRACT OF THE DISCLOSURE

N-substituted hydroxylamines are prepared by reacting the corresponding N-substituted secondary amines with an inorganic peroxide in the presence of a metal sequestering agent and in the absence of an oxidation accelerator.

---

This invention relates to novel chemical processes, and more particularly, to novel improved processes of preparing N-substituted hydroxylamines.

One object of this invention is to provide improved methods of preparing N-substituted hydroxylamines whereby increased yields may be obtained.

More particularly, it is an object of this invention to provide an improved synthesis of hydroxylamines by the oxidation of secondary amines.

Another object of the present invention is to provide an improved process to prepare compositions useful as developing agents for the development of silver halide emulsions.

A further object of this invention is to provide N-substituted hydroxylamines suitable for use in developer compositions useful in diffusion transfer processes.

The invention accordingly comprises the several steps and the relation and order of one or more of such steps with respect to each of the others, and the compositions possessing the features, properties and the relation of elements which are exemplified in the following detailed disclosure, and the scope of the application of which will be indicated in the claims.

It has now been discovered that N-substituted hydroxylamines can be prepared in high yields by the oxidation of secondary amines with hydrogen peroxide in the presence of a metal sequestering agent, as temperatures within the range of about 0° C. to about 150° C. without the need of the presence of compounds such as tungstates and vanadates.

It has been further discovered that contrary to expectation, the process proceeds more favorably at the high end of the temperature range.

The present invention is applicable to N-substituted hydroxylamines corresponding to the formula:

$$R^1-N-R^2$$
$$\quad\;\;|$$
$$\quad\;\;OH$$

wherein each of $R^1$ and $R^2$ are independently selected from the group consisting of alkyl, cycloalkyl, alkoxyalkyl, aralkyl, alkoxyalkoxyalkyl, or alkenyl radical. The alkyl, alkoxy and alkenyl radicals preferably contain from 1 to 3 carbons, but may contain more carbons provided the resulting compound is soluble in 5% aqueous sodium hydroxide.

Typical amines that can be oxidized to form substituted N-hydroxylamines include di-ethyl amine, di-n-propylamine, di-s-propylamine, di-n-butylamine, di-t-butylamine, N-ethyl-N-cyclohexylamine, N-ethyl-N-benzylamine, etc.

The preferred alkoxyalkyl hydroxylamines that can be prepared by this oxidation process include:

(1)
$$CH_3O-C_2H_4-N-C_2H_4-OCH_3$$
$$\qquad\qquad\quad\;\;|$$
$$\qquad\qquad\quad\;\;OH$$
N, N-di-(2-methoxyethyl)-hydroxylamine (2)
$$C_2H_5O-C_2H_4-N-C_2H_4-OC_2H_5$$
$$\qquad\qquad\quad\;\;|$$
$$\qquad\qquad\quad\;\;OH$$
N, N-di-(2-ethoxyethyl)-hydroxylamine (3)
$$CH_3O-C_2H_4O-C_2H_4-N-C_2H_4-OC_2H_4-OCH_3$$
$$\qquad\qquad\qquad\qquad\;\;|$$
$$\qquad\qquad\qquad\qquad\;OH$$
N, N-di-(2-methoxyethoxyethyl)-hydroxylamine (4)
$$C_2H_5O-C_2H_4-N-C_2H_5$$
$$\qquad\qquad\;|$$
$$\qquad\qquad\;OH$$
N-ethyl-N-2-ethoxyethyl hydroxylamine (5)
$$C_2H_5O-C_2H_4-N-CH_2-CH=CH_2$$
$$\qquad\qquad\;\;|$$
$$\qquad\qquad\;\;OH$$
N-allyl-N-2-ethoxyethyl hydroxylamine N-substituted hydroxylamines wherein the substituents on the nitrogen atom comprise alkoxyalkyl groups have been prepared by prior art processes which have resulted in small yields. U.S. Patent No. 3,293,034 issued to Green et al. discloses a method for the preparation of the hydroxylamines by the normal oxidation of bis-(methoxyethyl)amine with hydrogen peroxide at temperatures between about 20° and about 50° C. with the resulting yields being about 24% of the desired hydroxylamine, and substantially none of the starting material being recoverable. It is also known (cf. J. Chem. Soc., 1093 (1956) and J. Org. Chem., 30,597 (1965)), that while the desired hydroxylamine is being prepared in the presence of hydrogen peroxide, it will be subjected to a continuous degradation by this reagent via a free radical mechanism. This degradative oxidation process is catalyzed by trace metals such as copper and iron which are found present in water, solvents, piping, etc. all of which are associated with the formation process.

It is to be noted that the prior art as typified by P. Burckard, J. P. Fleury and F. Weiss, Bull. Soc. Chim, 2730 (1965) and German Patent No. 951,933 used in the oxidation of some types of amines with hydrogen peroxide, metal sequestering agents such as ethylene diaminetetraacetic acid hereinafter referred to as EDTA, as adjuncts to some reagents, which added reagents were claimed to have a special beneficial effect on such reactions. Typical added reagents used include the salts and oxides of tungsten, molybdenum, vanadium, and uranium, the most common one being sodium tungstate. However, it was determined in work associated with the present invention that the oxidation of bis(methoxyethyl)amine with hydrogen peroxide in the presence of sodium tungstate and EDTA at +5° C. and also at −8° C. actually resulted in decreased yields (14%) of the hydroxylamine, as opposed to the 22% when the peroxide is used alone. It is believed that these salts are oxidation accelerators, which allow the oxidation of the amine to the hydroxylamine to proceed at lower temperatures than those usually employed, but with the result that the yields as indicated are quite low. However, the catalytic effect is not selective, at least not in the case of the more sensitive amines, such as bis(methoxyethyl)amine, and thus both the formation and degradation reactions are accelerated.

The present invention is based on the assumption that while the degradative oxidation of hydroxylamines proceeds mainly via a free radical mechanism (and can thus be slowed down through the use of sequestering agents, as mentioned above), the oxidation itself of secondary amines to N-substituted hydroxylamines may still proceed through an ionic mechanism—not affected by the addition of sequestering agents.

It has now been found that N-substituted hydroxylamines can be prepared by the oxidation of N-substituted secondary amines with peroxides such as hydrogen peroxide and sodium peroxide, with good yields of the desired N-substituted hydroxylamine, and with the recovery of large amounts of starting material by using only the metal sequestering agent in conjunction with the peroxide, thus deleting the additional reagent of the prior art.

Typical metal sequestering agents include:

(1) N,N,N',N'-tetrahydroxyethylethylenediamine
(2) ethylenediaminetetraacetic acid
(3) aminotriacetic acid
(4) salicylaldoxime
(5) sodium diethyldithiocarbomate.

To contrast the process of the present invention with the prior art it should be noted that when the sequestering agent was used in conjunction with the additional reagent of the prior art, it was found that at 60° C. only 8% yield of desired N-substituted hydroxylamine was obtained with a total conversion of 34% based on the starting amine.

When both the sequestering agent and the additional reagent were omitted, at 60° C. the yield of hydroxylamine varied for several runs between 18% and 22% and the starting material was totally consumed.

Whereas in the present invention which utilizes just the sequestering agent with the peroxide, it was found that at 60° C. the yield was about 30% N-substituted hydroxylamine, but 60% of the starting amine was recoverable for recycling purposes. This is a conversion rate of 30% of the 40% of the consumed starting material, i.e., 75% yield based on the amount of starting material consumed.

The literature indicated that the use of lower temperatures when these competing reactions are taking place, namely the hydroxylamine formation oxidation from the amine, and the degradative over-oxidation of the hydroxylamine resulted in better selectivity of the reactions. The utilization of lower temperatures near 0° C. whereby absolute reaction rates of both the desired and undesired reactions would be reduced, such that the rate of the desired reaction would be faster than the rate of degradation such that a higher yield of the hydroxylamine end product could be recovered, seemed to be recommended.

While the process of the present invention is operable at temperatures as low as about 0° C., it has been discovered that the use of higher temperatures, above ambient temperatures, in conjunction with short reaction periods gave rise to better yields of the desired hydroxylamine. The preferred operating range is between about 50° and about 100° C.

The following detailed examples are given only to illustrate the preparation of preferred compounds within the scope of this invention, and are not intended to be in any way limiting.

Example I

A solution of 45% hydrogen peroxide (15.1 g.; 0.2 mole) was added dropwise under stirring to a solution of 26.6 g. (0.2 mole) of bis(methoxyethyl)amine and 2.0 g. (0.0054 mole) of ethylenediaminetetraacetic acid disodium salt dihydrate in 25 ml. of water which was progressively heated to 60° C. Addition was continued for 30 minutes at 60°, and this temperature was maintained for a further 45 minutes, by which time all the peroxide was consumed. Titration of the mixture indicated a 35.0% yield of bis(methoxyethyl)hydroxylamine and 31.5% of unreacted bis(methoxyethyl)amine.

Example II

A solution of 26.6 g. (0.2 mole) of bis(methoxyethyl) amine and 2.0 g. of EDTA in 25 ml. of water was preheated to 90° and 15.1 g. (0.2 mole) of 45% hydrogen peroxide was added dropwise over a five minute period while the temperature of the mixture was kept at 90° by external cooling. The resulting solution was kept at 90° for a further 5 minutes by which time all peroxide was consumed. Titration of the solution indicated a 40.2% yield of the hydroxylamine and 31.8% of the starting amine.

Example III

Under the same conditions as in Example 2, but at 30°, when the addition of the peroxide was spread over 1½ hours and the mixture was stored at room temperature for a further 20 hours, the yield of the hydroxylamine was only 28.6%, that of the recovered starting amine 28.7%, and 23.4% of 2-methoxyethylhydroxylamine was formed.

Example IV

A solution of 45% hydrogen peroxide (9.45 g.; 0.125 mole) was added over a five minute period to a refluxing and stirred mixture of 12.9 g. (.01 mole) of di-N-butylamine and 1.9 g. of ethylenediaminetetraacetic acid disodium salt dihydrate in 12 ml. of water, preheated to 60° C. Stirring was continued for five minutes, whereupon the mixture was cooled and extracted with hexane. Removal of the solvent gave 13.9 g. of an oil. Titration and vapor phase chromatographic analysis indicated a 55% yield of di-N,N-butylhydroxylamine and 20% of di-N-butylamine.

While the preparation of substituted hydroxylamines by the process of the present invention has been demonstrated in the above examples as being performed batchwise, the process can, by suitable adaptation as is known in the art, be practiced in a continuous manner.

As previously mentioned, the compounds prepared by the process of this invention are useful as developing agents in conventional or wet development of silver halide emulsions, diffusion transfer processes, both dye and silver, and are especially useful in such photographic processes wherein it is desired to eliminate or minimize the need for washing or stabilizing operations in liquid baths subsequent to the formation of the silver print. Examples of such processes are disclosed in U.S. Patent No. 3,293,034 to Milton Green et al.

In diffusion transfer processes of this type, as is well known in the art, an exposed silver halide emulsion is treated with a liquid processing composition while in superposed relationship with an image-receiving material. The liquid processing composition develops exposed silver halide to silver and reacts with unexposed silver halide to form a complex silver salt which is transferred to the image-receiving material and there reduced to silver to form a positive print. The processing composition includes a silver halide solvent, such as sodium thiosulfate, and may also contain a film-forming material for increasing the viscosity of the composition. As used herein, the term "silver halide solvent" refers to reagents which will form a soluble complex with silver halide, as is well known in the art of forming silver images by transfer.

Since certain changes may be made in the above compositions and processes without departing from the scope of the invention herein involved, it is intended that all matter contained in the above description shall be interpreted as illustrative and not in a limiting sense.

We claim:
1. The process which comprises reacting an N-substituted secondary amine wherein said substituents each are selected from alkyl, cycloalkyl, alkoxyalkyl, aralkyl, alkoxyalkoxyalkyl and alkenyl with an inorganic peroxide in the presence of a metal sequestering agent and in the absence of an oxidation accelerator to form an N-substituted hydroxylamine of the formula:

$$R^1-\underset{\underset{OH}{|}}{N}-R^2$$

wherein $R^1$ and $R^2$ each are selected from the group consisting of alkyl, cycloalkyl, alkoxyalkyl, aralkyl, alkoxyalkoxyalkyl and alkenyl, said reaction being carried out at a temperature between 0° and 150° C.

2. The process of claim 1 wherein the inorganic peroxide is hydrogen peroxide.

3. The process of claim 1 wherein the metal sequestering agent is ethylenediaminetatraacetic acid.

4. The process of claim 1 wherein the process is carried out at an operating temperature between about 50° and about 100° C.

5. The process of claim 2 wherein the metal sequestering agent is ethylenediaminetatraacetic acid.

6. The process of claim 5 wherein the secondary amine is bis(ethoxyethyl)amine.

7. The process of claim 5 wherein the secondary amine is di-n-butylamine.

8. The process of claim 5 wherein the secondary amine is bis(methoxyethyl)amine.

9. The process of claim 8 wherein the process is carried out at an operating temperature between about 50° and about 100° C.

References Cited

UNITED STATES PATENTS 3,243,462   3/1966   Smith.
3,293,034   12/1966  Green et al.

CHARLES B. PARKER, Primary Examiner

R. L. RAYMOND, Assistant Examiner

U.S. Cl. X.R.

260—563, 570.8, 570.9, 584